United States Patent [19]

Mizoguchi

[11] Patent Number: 5,305,351

[45] Date of Patent: Apr. 19, 1994

[54] ADAPTIVE EQUALIZER WHICH CARRIES OUT AN EQUALIZATION OPERATION WITH REFERENCE TO A MAGNITUDE OF FADING

[76] Inventor: Shoichi Mizoguchi, c/o NEC Corporation, 7-1, Shiba 5-chome, Minato-ku, Tokyo, Japan

[21] Appl. No.: 834,581

[22] Filed: Feb. 12, 1992

[30] Foreign Application Priority Data

Feb. 13, 1991 [JP] Japan .................. 3-040600

[51] Int. Cl.$^5$ .............................................. H03H 7/30
[52] U.S. Cl. ......................................... 375/14; 375/98; 364/724.2; 333/18; 333/28 R
[58] Field of Search ............... 375/11, 12, 14, 100, 375/98, 99; 455/304, 305, 245.1, 247.1, 250.1; 358/261.3; 333/18, 28 R; 364/724.2

[56] References Cited

U.S. PATENT DOCUMENTS

| | | | |
|---|---|---|---|
| 4,330,764 | 5/1982 | Miedema | 455/304 |
| 4,415,872 | 11/1983 | Karabinis | 375/101 |
| 4,769,825 | 9/1988 | Vogel | 375/58 |

OTHER PUBLICATIONS

"Dizitam Singô Syon (Digital Signal Processing)", Institute of Electronics and Communication, 1975, p. 241, Table 11.2.

*Primary Examiner*—Curtis Kuntz
*Assistant Examiner*—Don N. Vo

[57] ABSTRACT

For use in combination with a demodulator (23) for demodulating a received signal susceptible to fading into a demodulated signal, an adaptive equalizer comprises a fading detecting circuit (51) for detecting the received signal to produce a detection signal representative of a magnitude of the fading. Into a processed signal and supplied with the detection signal, an equalizer multiplier (53) processes an equalized signal produced in an equalizer section (25, 26 and 27) which is for carrying out a predetermined equalization operation. In accordance with the processed signal, an automatic gain control circuit (52) modifies the demodulated signal into a modified signal on which the predetermined equalization operation is carried out.

3 Claims, 10 Drawing Sheets

ADAPTIVE EQUALIZER WHICH CARRIES OUT AN EQUALIZATION OPERATION WITH REFERENCE TO A MAGNITUDE OF FADING

BACKGROUND OF THE INVENTION

This invention relates to an adaptive equalizer which is used in combination with a demodulator.

Into a demodulated signal, the demodulator demodulates a received signal which may be susceptible to fading while transmitted to the demodulator through a radio channel. The demodulated signal may be a baseband signal having a binary level or a multilevel.

A conventional adaptive equalizer is supplied with the demodulated signal and comprises a modifying circuit, an equalizer section, an expanding circuit, and a control circuit which will presently be described.

The modifying circuit is for carrying out a compression operation on the demodulated signal in accordance with a compression ratio and produces a modified signal representative of a result of the compression operation. The equalizer section is for carrying out an equalization operation on the modified signal in accordance with controllable tap gains and produces an equalized signal representative of a result of the equalization operation. The expanding circuit is for carrying out an expansion operation on the equalized signal in accordance with an expansion ratio and produces an expanded signal representative of a result of the expansion operation. The control circuit is for controlling each of the compression and the expansion ratios in accordance with the controllable tap gains.

The fading has a magnitude which varies dependent on conditions of the radio channel. When the magnitude of the fading becomes greater than a predetermined value, the control circuit makes each of the compression and the expansion ratios change stepwise. In this connection, a time lag is inevitably between a time instant when the compression ratio is changed and another time instant when the expansion ratio is changed. This results in malfunction of the equalization operation in the equalizer section. This is because the equalizer section does not exactly carry out the equalization operation during a particular time interval which is determined due to the time lag.

In addition, each of the compression and the expansion ratios is determined in accordance with the controllable tap gains. In this connection, each of the compression and the expansion ratios is given an incoherent value when the malfunction is caused in the equalizer section to make the controllable tap gains become abnormal. When at least one of the compression and the expansion ratios is given the incoherent value, the equalizer section is put in an abnormal condition in which the equalization operation is not exactly carried out. However, it is extremely difficult to recover the equalizer section from the abnormal condition to a normal condition in which the equalization operation is exactly carried out.

SUMMARY OF THE INVENTION

It is therefore an object of this invention to provide an adaptive equalizer in which an equalization operation is exactly carried out regardless of a magnitude of fading.

It is another object of this invention to provide an adaptive equalizer which is of the type described and in which it is readily and quickly carried out to recover an equalizer section from an abnormal condition to a normal condition.

Other objects of this invention will become clear as the description proceeds.

According to this invention, there is provided an adaptive equalizer for use in combination with a demodulator which is for demodulating a received signal susceptible to fading into a demodulated signal. The adaptive equalizer includes modifying means for modifying the demodulated signal into a modified signal in accordance with a control signal, an equalizer section for carrying out a predetermined equalization operation on the modified signal to produce an equalized signal representative of a result of the predetermined equalization operation. The adaptive equalizer further comprises detecting means for detecting the received signal to produce a detection signal representative of a magnitude of the fading, processing means connected to the equalizer section and the detecting means for processing the equalized signal into a processed signal in accordance with the detection signal, and supplying means connected to the modifying and the processing means for supplying the processed signal as the control signal to the modifying means.

DESCRIPTION OF THE PREFERRED EMBODIMENT

Figure 1:
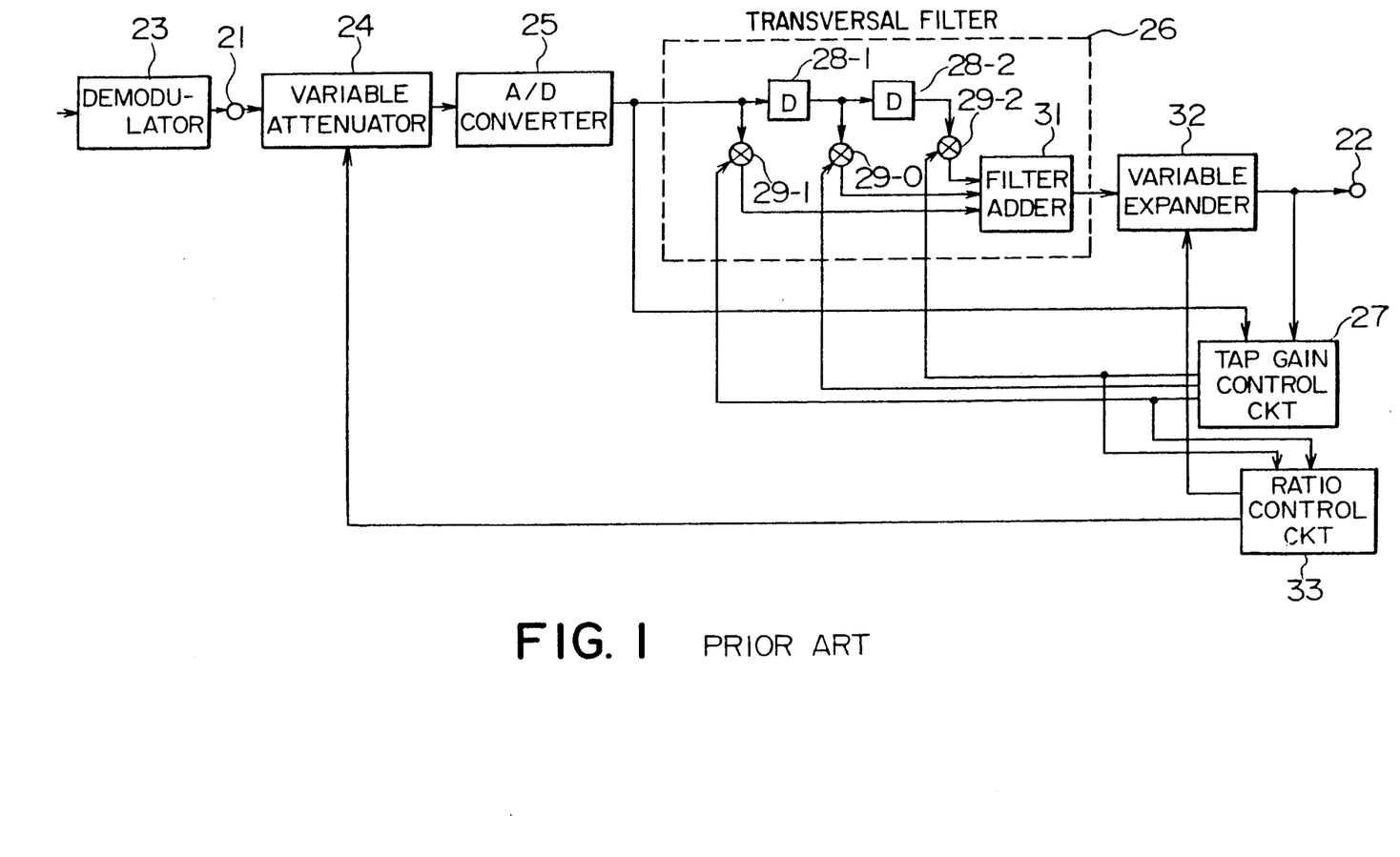
FIG. 1 is a block diagram of a conventional adaptive equalizer.

Referring to FIG. 1, description will first be made as regards a conventional adaptive equalizer for a better understanding of this invention. The adaptive equalizer is generally called a digital transversal equalizer and has equalizer input and equalizer output terminals 21 and 22. The input terminal 21 is connected to a demodulator 23. Through a radio channel, a transmitted signal is supplied to the demodulator 23 as a received signal which is susceptible to fading while transmitted to the demodulator 23 through the radio channel. The transmitted signal may be, for example, a modulated signal into which a carrier signal is modulated by a digital signal. The digital signal is produced by sampling an analog signal at a sampling frequency f. The analog signal may be a speech signal.

The demodulator 23 demodulates the received signal into a demodulated signal to supply the demodulated signal to the input terminal 21 of the adaptive equalizer. The demodulated signal may be a baseband signal having a binary level or a multilevel. The adaptive equalizer is for equalizing the demodulated signal into an equalizer output signal and for supplying the output signal to the output terminal 22.

The adaptive equalizer comprises a variable attenuator 24, an analog-to-digital converter 25, and a transversal filter 26 which will presently be described. The variable attenuator 24 is connected to the input terminal 21 and has a compression ratio determined in response to a compression signal which will later be described in detail. Supplied with the demodulated signal through the input terminal 21, the variable attenuator 24 produces an attenuated signal or a modified signal with reference to the compression ratio as will later be described in detail. The modified signal is representative of waveform information of the demodulated signal. In this event, the modified signal is controlled to have a level which is lower than that for the converter 25 even when the received signal has a waveform distortion due to the fading. The modified signal is supplied to the converter 25.

The converter 25 converts the modified signal into a succession of sampling/quantization binary signal in the manner known in the art. The binary signal succession is supplied to the transversal filter 26.

The transversal filter 26 is of a three-tap type and is for filtering the binary signal succession into an equalized signal in accordance with a main, a first, and a second controllable tap gain. The main, the first, and the second tap gains are supplied from a tap gain control circuit 27 to the transversal filter 26.

The transversal filter 26 comprises first and second delay circuits (D) 28-1 and 28-2 and main, first, and second filter multipliers 29-0, 29-1, and 29-2. Each of the first and the second delay circuits 28-1 and 28-2 gives a delay of a predetermined time (1/f) to a signal supplied thereto. The binary signal succession is supplied to the first filter multiplier 29-1. The first and the second delay circuits 28-1 and 28-2 supply a first and a second delayed signal to the main and the second filter multipliers 29-0 and 29-2, respectively.

Supplied with the first controllable tap gain in the manner which will be described hereinafter, the first filter multiplier 29-1 multiplies the binary signal succession by the first controllable tap gain to supply a first multiplied signal to a filter adder 31. The main filter multiplier 29-0 and the second filter multiplier 29-2 multiply the first and the second delayed signals by the main controllable tap gain and the second controllable tap gain to supply a main and a second multiplied signal to the filter adder 31, respectively. The filter adder 31 calculates a total sum of the main, the first, and the second multiplied signals to supply the total sum as the equalized signal to a variable expander 32.

The variable expander 32 has an expansion ratio determined in response to an expansion signal which will later be described in detail. Responsive to the equalized signal, the variable expander 32 produces an expanded signal with reference to the expansion signal as will later be described in detail. In this event, the expansion ratio is equal to an inverse number of the compression ratio. The expanded signal is sent as the equalizer output signal from the variable expander 32 to the output terminal 22.

The tap gain control circuit 27 is supplied with the binary signal succession and a particular part of the expanded signal and gives correlation between the binary signal succession and the particular part by a predetermined digital arithmetic operation to produce the main, the first, and the second controllable tap gains in the manner known in the art. An n-th tap gain C(n) is given by:

$$C(n) = E(j) + D(k),$$

where n is given as follows:

$$n = k - j,$$

and will become clear in the following. Such a manner of tap gain control is described in detail in various references, for example, a book edited by the Institute of Electronics and Communication, 1975, under the title of "Dizitaru Singô Syori (Digital Signal Processing)", page 241, Table 11.2.

The adaptive equalizer further comprises a ratio control circuit 33 connected to the variable attenuator 24, the tap gain control circuit 27, and the variable expander 32. Each of the main, the first, and the second tap gains varies dependent on the magnitude of the fading. Supplied with the first and the second tap gains from the tap gain control circuit 27, the ratio control circuit 33 produces the compression and the expansion signals with reference to the first and the second tap gains. The compression signal is supplied to the variable attenuator 24. The expansion signal is supplied to the variable expander 32.

Figure 2A:
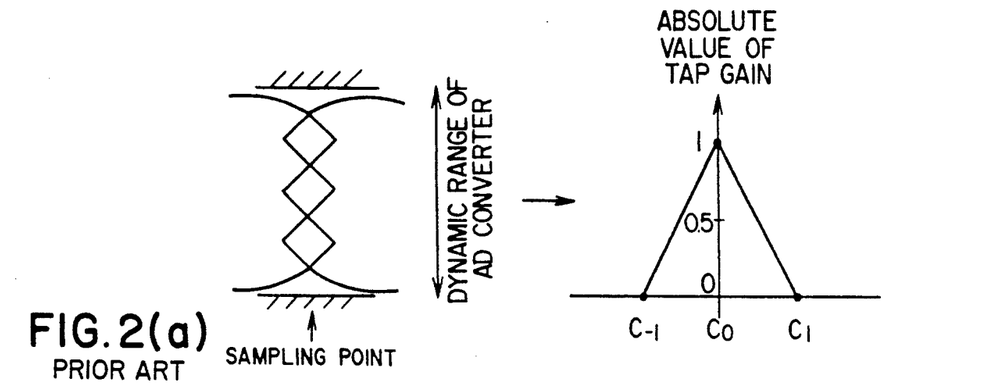
FIG. 2a-2c are the diagrams for use in describing a magnitude of a waveform distortion due to fading and absolute values of tap coefficients.
Figure 2B:
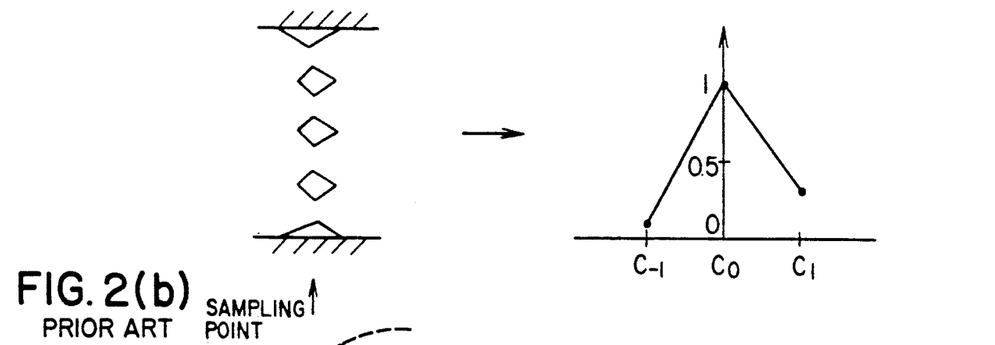
Figure 2C:
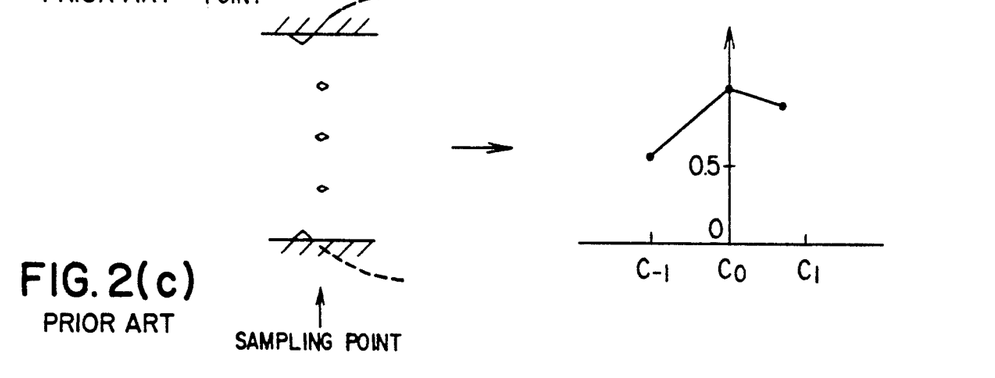
Figure 3:
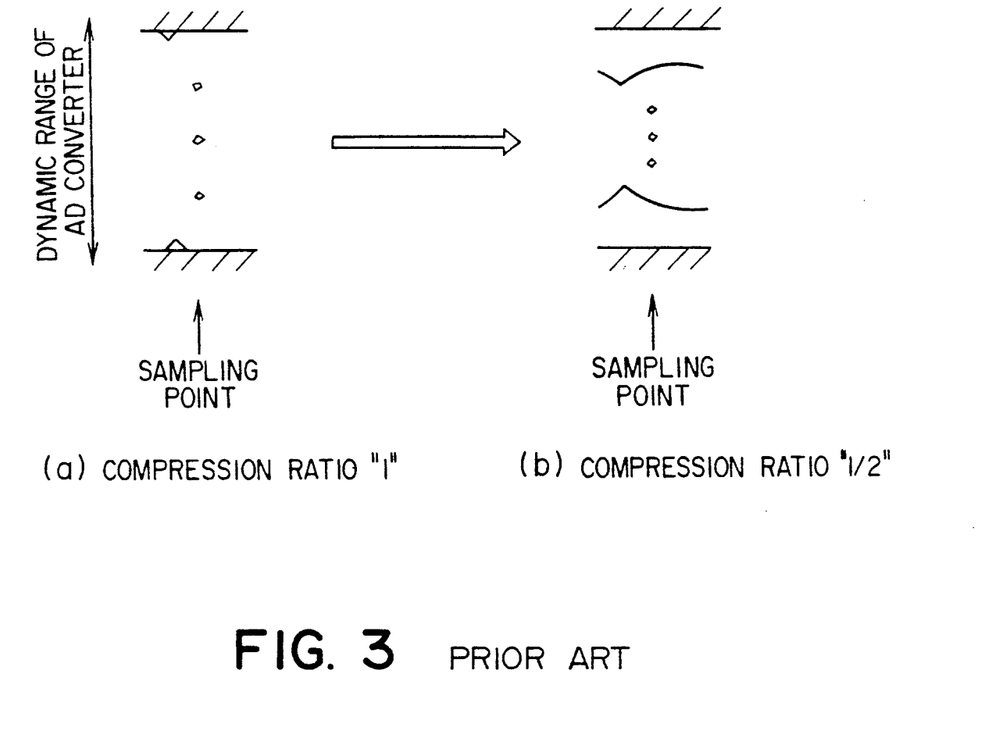
FIG. 3 is a diagram for use in describing a compression effect of a baseband signal on occurrence of the waveform distortion.
Figure 4:
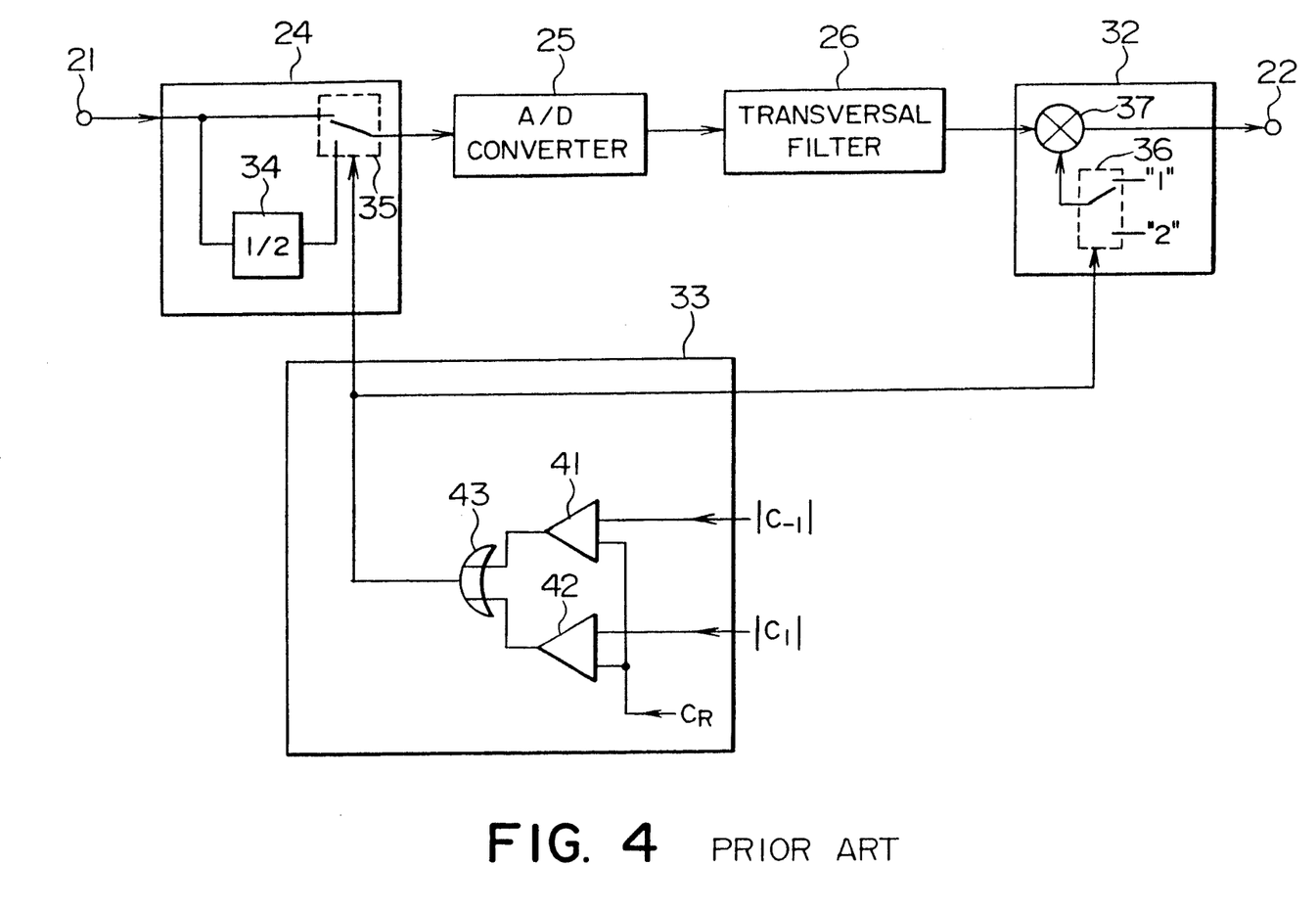
FIG. 4 is a block diagram of a main part included in the conventional adaptive equalizer illustrated in FIG. 1.

Referring to FIGS. 2 to 4, the description is directed to a manner which is for determining the compression and the expansion ratios.

FIG. 2 shows an eye pattern of the demodulated signal on a left side of the figure and shows the main, the first, and the second tap gains $C_0$, $C_{-1}$, and $C_1$ on a right side of the figure. It is assumed here that each of the compression and the expansion ratios is equal to "1".

In a case where the fading is absent, the eye pattern has a level which is within a dynamic range of the converter 25 as depicted along a first or top row labelled (a). In this case, the main tap gains $C_0$ is equal to "1" while each of the first and the second tap gains $C_{-1}$ and $C_1$ is equal to "0".

On occurrence of the fading which is relatively small, the waveform distortion appears in the eye pattern as depicted along a second row labelled (b). However, the multilevel of the demodulated signal does not exceed the dynamic range of the converter 25 at a sampling point. In this event, the first and the second tap gains $C_{-1}$ and $C_1$ have a first and a second absolute value which are relatively small.

With an increase in the fading, the waveform distortion of the eye pattern becomes extemely large. As a result, the multilevel of the demodulated signal exceeds the dynamic range of the converter 25 as depicted along a third or bottom row labelled (c). In this event, each of the first and the second tap gains becomes extremely large and approaches to "1".

Responsive to the first and the second tap gains, the ratio control circuit 33 produces the compression signal to change the compression ratio from "1" to "½". As a result, the demodulated signal is made to fall within the dynamic range of the converter 25 as will become clear from FIGS. 3(a) and (b). In this event, the ratio control circuit 33 produces the expansion signal to change the expansion ratio from "1" to "2".

Referring to FIG. 4, the description will be directed to the variable attenuator 24, the variable expander 32, and the ratio control circuit 33. The variable attenuator comprises a ½ attenuator element 34 and an attenuator switching unit 35. The ½ attenuator element 34 is connected to the input terminal 21 and is for producing an additional signal with reference to the modified signal in the manner known in the art. The attenuator switching unit 35 is connected to the input terminal 21, the ½ attenuator element 34, and the ratio control circuit 33 and for selecting, as the attenuated signal, one of the demodulated and the additional signals with reference to the compression signal.

The variable expander 32 comprises an expander switching element 36 and a digital multiplier 37. The expander switching element 36 is connected to the ratio control circuit 33 and is for selecting, as the expansion ratio, one of "1" and "2" with reference to the expansion signal. The digital multiplier 37 is connected to the transversal filter 26 and the expander switching element 36 and is for multiplying the equalized signal by the expansion ratio to produce the expanded signal that is sent to the output terminal 22.

The ratio control circuit 33 comprises a first comparison circuit 41, a second comparison circuit 42, and an OR circuit 43. The first comparison circuit 41 carries out a first comparison operation between the first absolute value $|C_{-1}|$ and a reference value $C_R$ to produce a first comparison result signal representative of the first comparison operation. The second comparison circuit 42 carries out a second comparison operation between the second absolute value $|C_1|$ and the reference value $C_R$ to produce a second comparison result signal representative of the second comparison operation. Responsive to the first and the second comparison result signals, the OR circuit 43 produces a selection control signal as each of the compression and the expansion signals when at least one of the first and the second absolute values $|C_{-1}|$ and $|C_1|$ is larger than the reference value.

Turning back to FIG. 1, a time lag is inevitably produced between changes of the modified and the equalized signals. This is because the first and the second delay circuits 28-1 and 28-2 are interposed between the variable attenuator 24 and the variable expander 32. Accordingly, it is necessary to provide a time interval which is between operations of the variable attenuator 24 and the variable expander 32 and which corresponds to the time lag. However, it is extremely difficult to determine the time interval.

Figure 5:
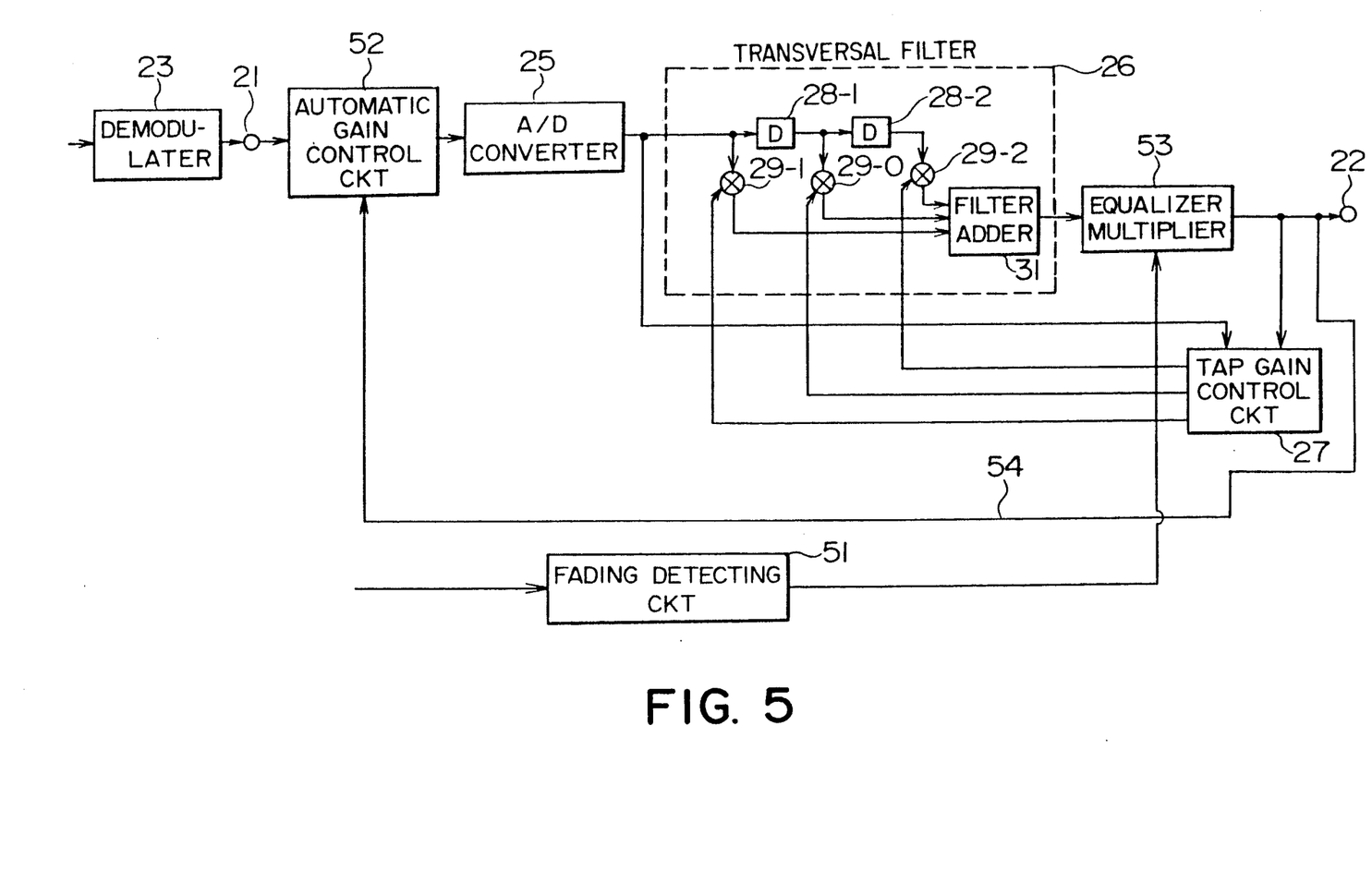
FIG. 5 is a block diagram of an adaptive equalizer according to an embodiment of this invention.

Referring to FIG. 5, the description will be directed to an adaptive equalizer according to an embodiment of this invention. The adaptive equalizer comprises similar parts designated by like reference numerals.

In FIG. 5, the adaptive equalizer comprises a fading detecting circuit 51 which is for detecting the received signal to produce a fading detection signal representative of the magnitude of the fading. The fading detecting circuit 51 will later be described in detail.

The adaptive equalizer further comprises an automatic gain control circuit 52 and an equalizer multiplier 53 which are substituted for the variable attenuator 24 and the variable expander 32, respectively. The automatic gain control circuit 52 is connected to the input terminal 21 and the A/D converter 25 and has a variable control gain which is variable dependent on a control signal which will later become clear. Supplied with the demodulated signal, the automatic gain control circuit 52 produces the modified signal in accordance with the variable control gain. The variable control gain varies so that the modified signal has a level which does not exceed the dynamic range of the converter 25. Supplied with the modified signal, the converter 25 produces the binary signal succession. The automatic gain control circuit 52 is alternatively referred to herein as a modifying arrangement.

The equalizer multiplier 53 is connected to the output terminal 22, the transversal filter 26, the gain control circuit 27, and the detecting circuit 51 and has a variable multiplying coefficient which is variable dependent on the detection signal. The equalizer multiplier 53 is for multiplying the equalized signal by the variable multiplying coefficient to produce a multiplied signal as the equalizer output signal. In other words, the equalizer multiplier 53 processes the equalized signal into the processed signal in accordance with the variable multiplying coefficient. The equalizer multiplier 53 is alternatively referred to as a processing arrangement.

The processed signal is supplied as the control signal to the automatic gain control circuit 52 through a line 54 which connects the automatic gain control circuit 52 to the equalizer multiplier 53. The line 54 is referred to herein as a supplying arrangement.

When the magnitude of the fading is relatively large, the variable multiplying coefficient is determined to have a first value which is relatively large. In this event, the variable control gain is lowered to make the processed signal have a level which is constant. When the fading becomes small or equal to zero, the waveform distortion is attenuated or disappears. In this event, the variable multiplying coefficient is determined to have a second value which is less than the first value.

The variable multiplying coefficient is smoothly changed in accordance with the detection signal. As a consequence, the transversal filter 26 is not put in an abnormal condition in which the equalization operation is not exactly carried out. In addition, the variable control gain is changed dependent on the variable multiplying coefficient. Accordingly, the adaptive equalizer is not brought into malfunction but properly carries out the equalization operation even when the variable multiplying coefficient and the variable control gain are changed.

Figure 6:
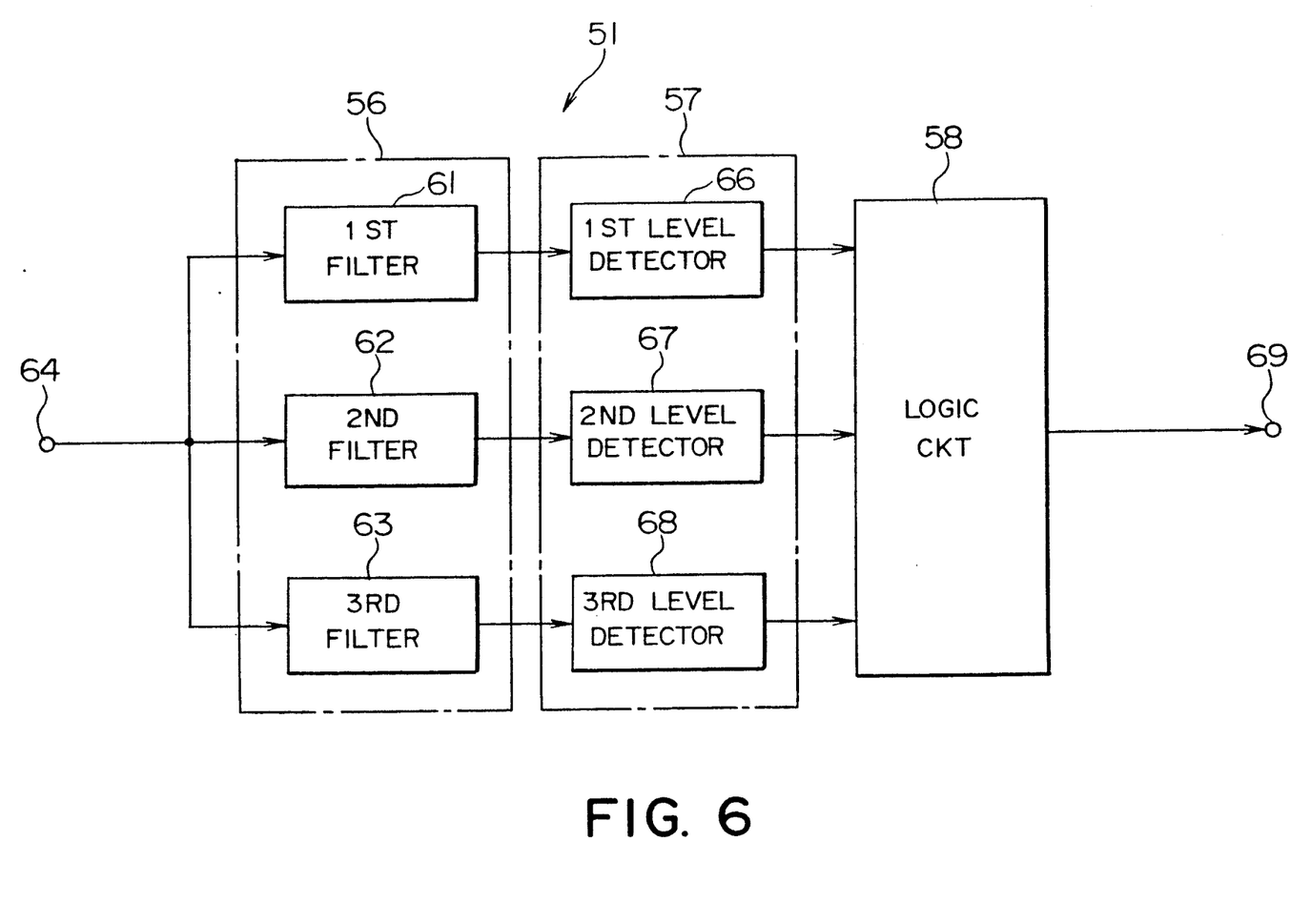
FIG. 6 is a block diagram of a detecting circuit for use in the adaptive equalizer illustrated in FIG. 5.
Figure 7:
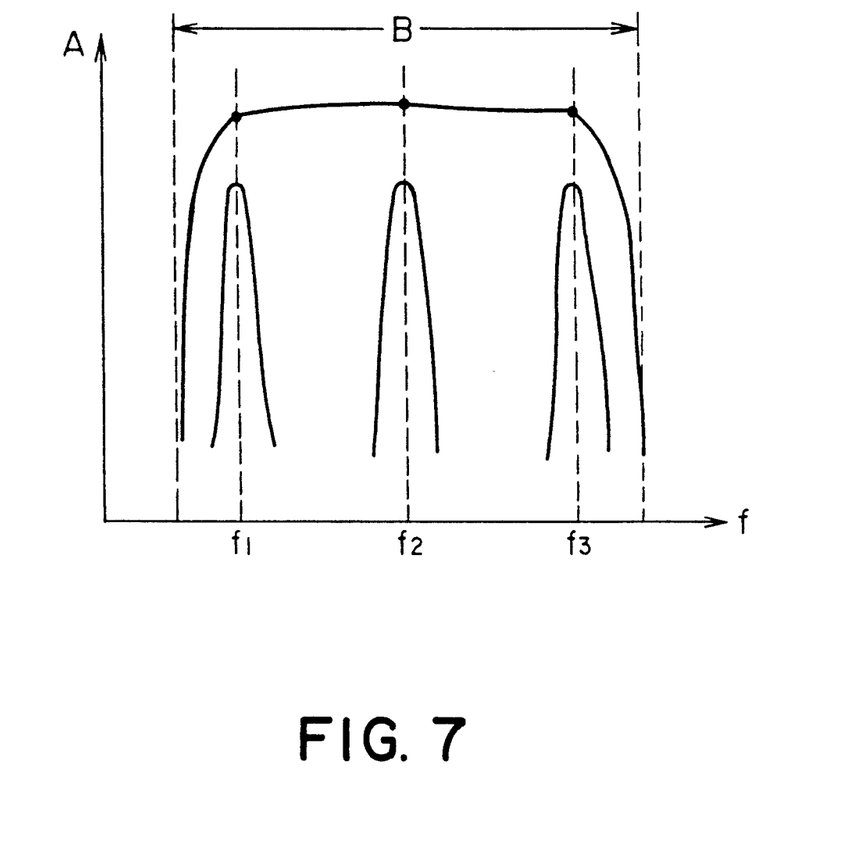
FIG. 7 is a diagram for use in describing a narrow-band filter for use in the detecting circuit illustrated in FIG. 6.

Turning to FIGS. 6 and 7, the description will be directed to the detecting circuit 51. In FIG. 6, the detecting circuit 51 comprises a selecting section 56, a detecting section 57, and a logic circuit 58 which will presently be described.

The selecting section 56 comprises first, second, and third filters 61, 62, and 63 which are connected to a circuit input terminal 64. The received signal is supplied to the circuit input terminal 64 and has a modulation spectrum which is illustrated by a generally continuous curve in FIG. 7 representative of an amplitude A of the spectrum versus the frequency indicated at f. The first filter 61 is for selecting a first frequency component $f_1$ from the modulation spectrum to produce a first selected signal representative of the first frequency component $f_1$. The second filter 62 is for selecting a second frequency component $f_2$ from the modulation spectrum to produce a second selected signal representative of the second frequency component $f_2$. The third filter 63 is for selecting a third frequency component $f_3$ from the modulation spectrum to produce a third selected signal representative of the third frequency component $f_3$.

The detecting section 57 comprises first, second, and third level detectors 66, 67, and 68 which are connected to the first, the second, and the third filters 61, 62, and 63, respectively. Responsive to the first, the second, and the third selected signals, the first, the second, the third level detectors 66, 67, and 68 produce first, second, third detection signals, respectively. Each of the first, the second, and the third detection signals is represented by a binary code and is supplied as a succession of digital signals to the logic circuit 58.

Responsive to the first, the second, and the third detection signals, the logic circuit 58 produces the fading detection signal and sends the fading detection signal to a circuit output terminal 69 which is connected to the equalizer multiplier 53 (FIG. 5).

The description will be directed to production of the first through the third detection signals. The fading distortion is generally classified into a linear amplitude distortion (LAD) and a quadric amplitude distortion (QAD). Subjected to the LAD, the modulation spectrum appears as exemplified in FIG. 8. In this event, the modulation spectrum has different amplitude values $L_1$ and $L_3$ at the first and the third frequency components $f_1$ and $f_3$, respectively. Responsive to different amplitude values $L_1$ and $L_3$, the first and the third level detectors 66 and 68 produce the first and the third detection signals, respectively.

Figure 9:
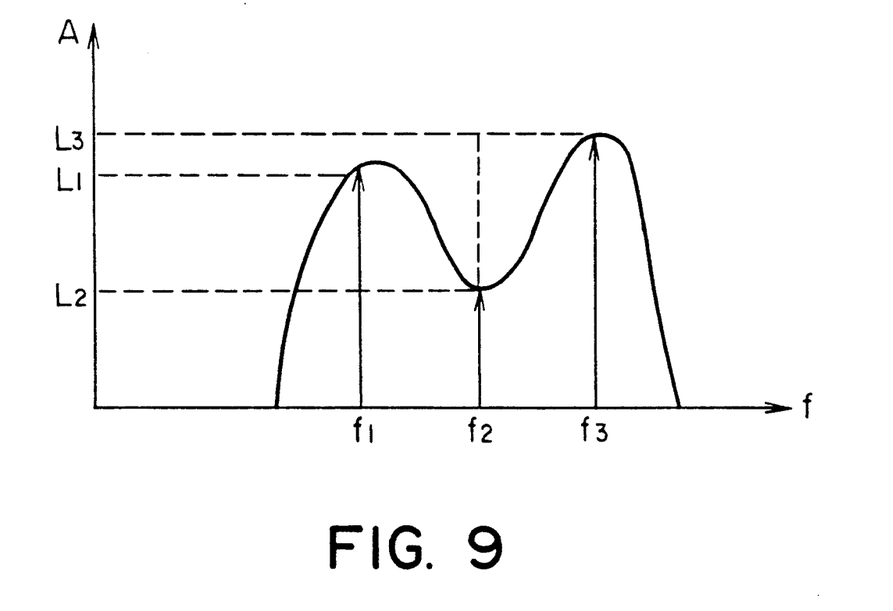
FIG. 9 is a graphic chart representative of a spectrum having a quadric amplitude distortion.

Subjected to the QAD, the modulation spectrum appears as exemplified in FIG. 9. In this event, the modulation spectrum has different amplitude values $L_1$, $L_2$, and $L_3$ at the first, the second, and the third frequency components $f_1$, $f_2$, and $f_3$, respectively. Responsive to the different amplitude values $L_1$, $L_2$, and $L_3$, the first, the second, and the third level detectors 66, 67, and 68 produce the first, the second, and the third detection signals, respectively.

Figure 8:
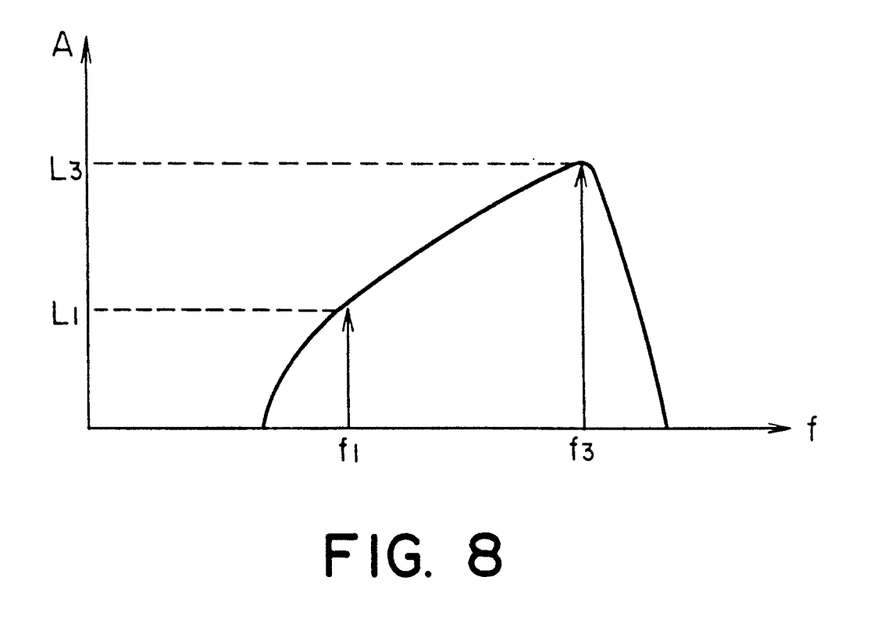
FIG. 8 is a graphic chart representative of a spectrum having a linear amplitude distortion.

FIGS. 8 and 9 will be compared with each other. The LAD and the QAD are distinguished from each other by checking whether or not a notch portion appears in the generally continuous curve that is representative of the modulation spectrum.

In a first case where the modulation spectrum is subjected to the LAD, the magnitude of fading is rrpresented by a primary gradient DL of the generally continuous curve. The primary gradient DL is given by:

$$DL = L_3 - L_1. \quad (1)$$

In a second case where the modulation spectrum is subjected to the QAD, the magnitude of fading is represented by an amount QL of a dip of the notch portion. The amount QL of dip is given by:

$$QL = (L_1 + L_3)/2 - L_2. \quad (2)$$

Figure 10:
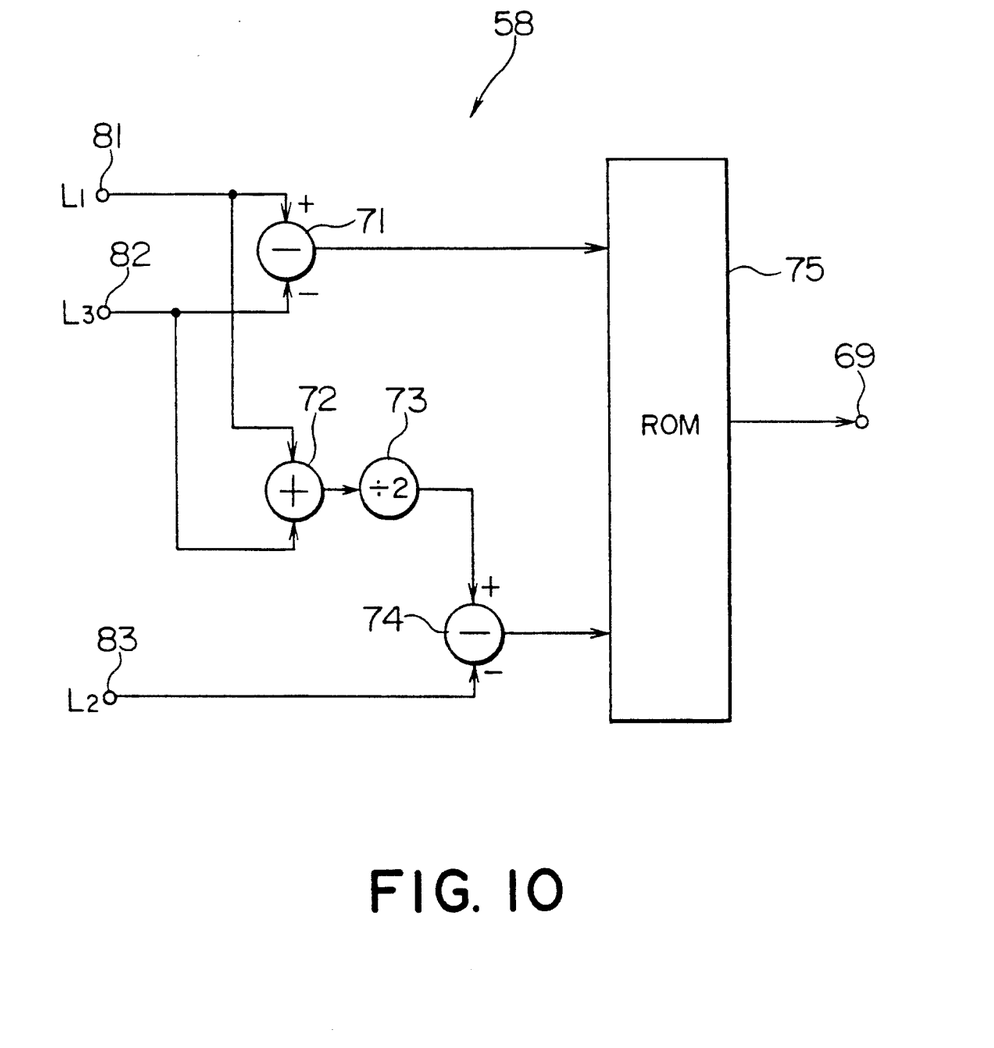
FIG. 10 is a block diagram of a logic circuit for use in the detecting circuit illustrated in FIG. 7.
Figure 11:
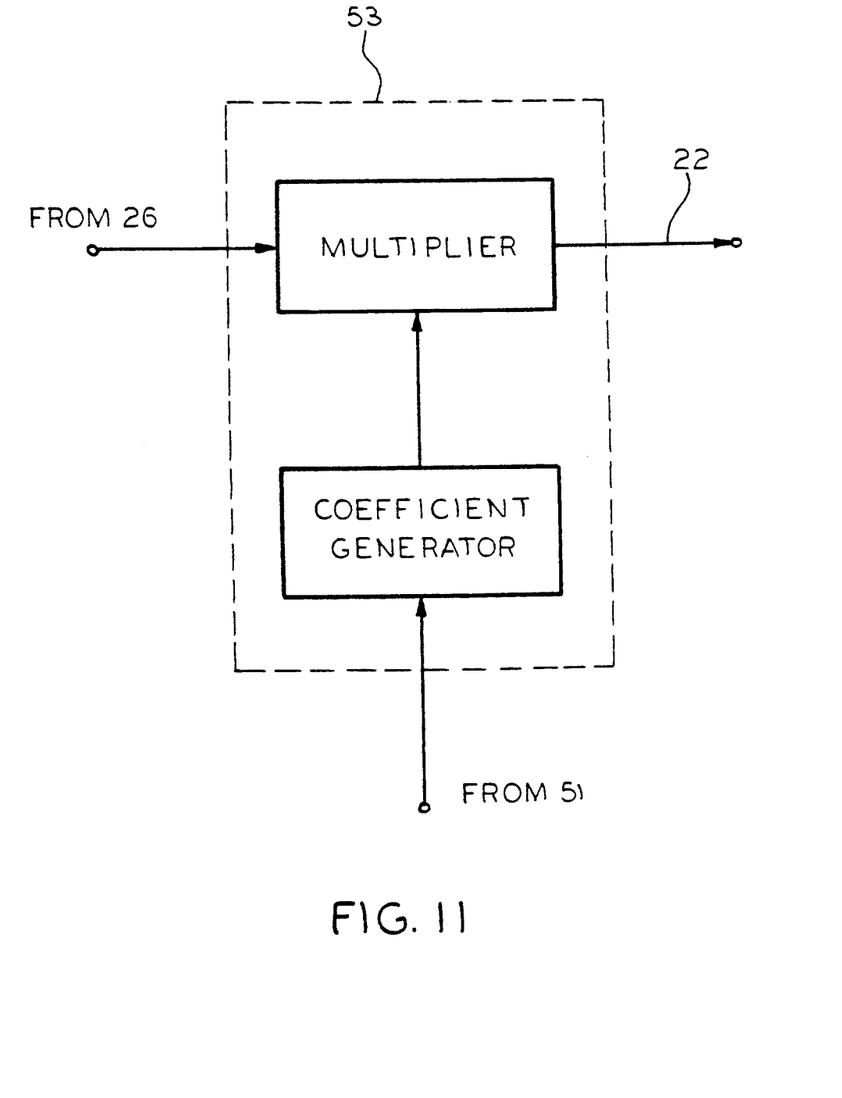
FIG. 11 is a block diagram of an equalizer multiplier for use in the adaptive equalizer illustrated in FIG. 5.

Turning to FIG. 10, the logic circuit 58 comprises a first subtracter 71, a circuit adder 72, a circuit divider 73, a second subtracter 74, and a read only memory (ROM) 75. These circuit elements will presently be described.

The first subtracter 71 is connected to first and second local input terminals 81 and 82 which are supplied with the first and the second detection signals. Responsive to the first and the second detection signals, the first subtractor 71 carries out a first subtration operation between the first and the second detection signals in accordance with Equation (1) to produce a first subtracted signal representative of a result of the first subtraction operation. The first subtracted signal is represented by a first binary value L and is supplied to the ROM 75.

The circuit adder 72 is connected to the first and the second local input terminals 81 and 82. Responsive to the first and the second detection signals, the circuit adder 72 carries out an addition operation of the first and the second detection signals to produce an added signal representative of a result of the addition operation.

The circuit divider 73 is connected to the circuit adder 72. The circuit divider 73 is for dividing the added signal by two to produce a divided signal.

The second subtractor 74 is connected to the circuit divider 73 and a third local input terminal 83 which is supplied with the third detection signal. Responsive to the divided and the third detection signals, the second subtracter 74 carries out a second subtraction operation between the divided and the third detection signals to produce a second subtracted signal representative of the second subtraction operation. The second subtracted signal is represented by a second binary value Q and is supplied to the ROM 75.

It is to be noted that a combination of the circuit adder 72, the circuit divider 73, and the second subtracter 74 is operable as a calculation circuit. In the manner described above, the calculation circuit (72-74) carries out a predetermined calculation which is defined by Equation (2).

The ROM 75 is connected to the first and the second subtractors 71 and 74 and to the circuit output terminal 69. Responsive to the first and the second subtracted signals, the ROM 75 calculates a local multiplying coefficient in accordance with a conversion table as follows.

| | Conversion Table | | | | | |
| | L | | | | | |
| Q | 0–5 | 5–10 | 10–15 | 15–20 | 20–25 | 25 or more |
| --- | --- | --- | --- | --- | --- | --- |
| 0–5 | 1 | 1/0.9 | 1/0.8 | 1/0.7 | 1/0.6 | 1/0.5 |
| 5–10 | 1/0.9 | 1/0.8 | 1/0.7 | 1/0.6 | 1/0.5 | 1/0.4 |
| 10–15 | 1/0.8 | 1/0.7 | 1/0.6 | 1/0.5 | 1/0.4 | 1/0.4 |
| 15–20 | 1/0.7 | 1/0.6 | 1/0.5 | 1/0.4 | 1/0.4 | 1/0.4 |
| 20–25 | 1/0.6 | 1/0.5 | 1/0.4 | 1/0.4 | 1/0.4 | 1/0.4 |
| 25 or more | 1/0.5 | 1/0.4 | 1/0.4 | 1/0.4 | 1/0.4 | 1/0.4 |

In the conversion table, each of the first and the second binary values L and Q is presented in decibels. Responsive to the local multiplying coefficient, the ROM 75 produces the fading detection signal that is sent to the circuit output terminal 69. The local multiplying coefficient is equivalent to the variable multiplying coefficient.

The variable control gain is proportional to the inverse number of the variable multiplying coefficient. When the magnitude of the fading is small such that each of the first and the second binary values L and Q is equal to zero, the local multiplying coefficient is equal to "1". Accordingly, each of the variable multiplying coefficient and the variable control gain is equal to "1".

When the magnitude of the fading is large such that the first binary value L is equal to 17 dB while the second binary value Q is equal to 12 dB, the local multiplying coefficient is equal to "1/0.5", namely, "2". Accordingly, the variable multiplying coefficient is equal to "2". The variable control gain is equal to "½".

What is claimed is:

1. An adaptive equalizer for use in combination with a demodulator for producing a demodulated signal responsive to a received signal which is susceptible to fading, said adaptive equalizer including modifying means for modifying said demodulated signal into a modified signal in accordance with a control signal, an equalizer section for carrying out a predetermined equalization operation on said modified signal to produce an equalized signal representative of a result of said predetermined equalization operation, detecting means for detecting said received signal to produce a detection signal representative of a magnitude of said fading;

processing means connected to said equalizer section and said detecting means for processing said equalized signal into a processed signal in accordance with said detection signal; and supplying means connected to said modifying and said processing means for supplying said processed signal as said control signal to said modifying means, said processing means comprising:

coefficient-determining means connected to said detecting means for determining a multiplication coefficient in accordance with said detection signal; and multiplying means connected to said equalizer section and said coefficient determining means for carrying out a multiplication operation between said equalized signal and said multiplication coefficient to produce, as said processed signal, a signal representative of a result of said multiplication operation..

2. An adaptive equalizer as claimed in claim 1, wherein said modifying means comprises:

gain-determining means connected to said multiplying means for determining a gain in accordance with said control signal; and control means connected to said gain-determining means and said equalizer section for controlling a level of said demodulated signal in accordance with said gain.

3. An adaptive equalizer as claimed in claim 1, wherein said received signal has a plurality of frequency components, said detecting means further comprising:

selecting means for selecting said frequency components from said received signal;

level-detecting means connected to said selecting means for detecting said frequency components to produce a level signal representative of levels of said frequency components; and producing means connected to said level detecting and said mentioned processing means for producing said detection signal in accordance with said level signal.

* * * * *